CODED-INFORMATION TRANSLATING SYSTEM

Filed July 2, 1958 7 Sheets-Sheet 1

INVENTOR.
EDWIN O. BLODGETT
BY John A. Harvey
ATTORNEY

CODED-INFORMATION TRANSLATING SYSTEM

Aug. 27, 1963 E. O. BLODGETT 3,102,253

CODED-INFORMATION TRANSLATING SYSTEM

Filed July 2, 1958 7 Sheets-Sheet 7

INVENTOR.
EDWIN O. BLODGETT
BY John A. Harvey
ATTORNEY

United States Patent Office 3,102,253

Patented Aug. 27, 1963

3,102,253

CODED-INFORMATION TRANSLATING SYSTEM

Edwin O. Blodgett, Rochester, N.Y., assignor to Commercial Controls Corporation, Rochester, N.Y., a corporation of Delaware

Filed July 2, 1958, Ser. No. 746,254

21 Claims. (Cl. 340—146.1)

Figure 1A:
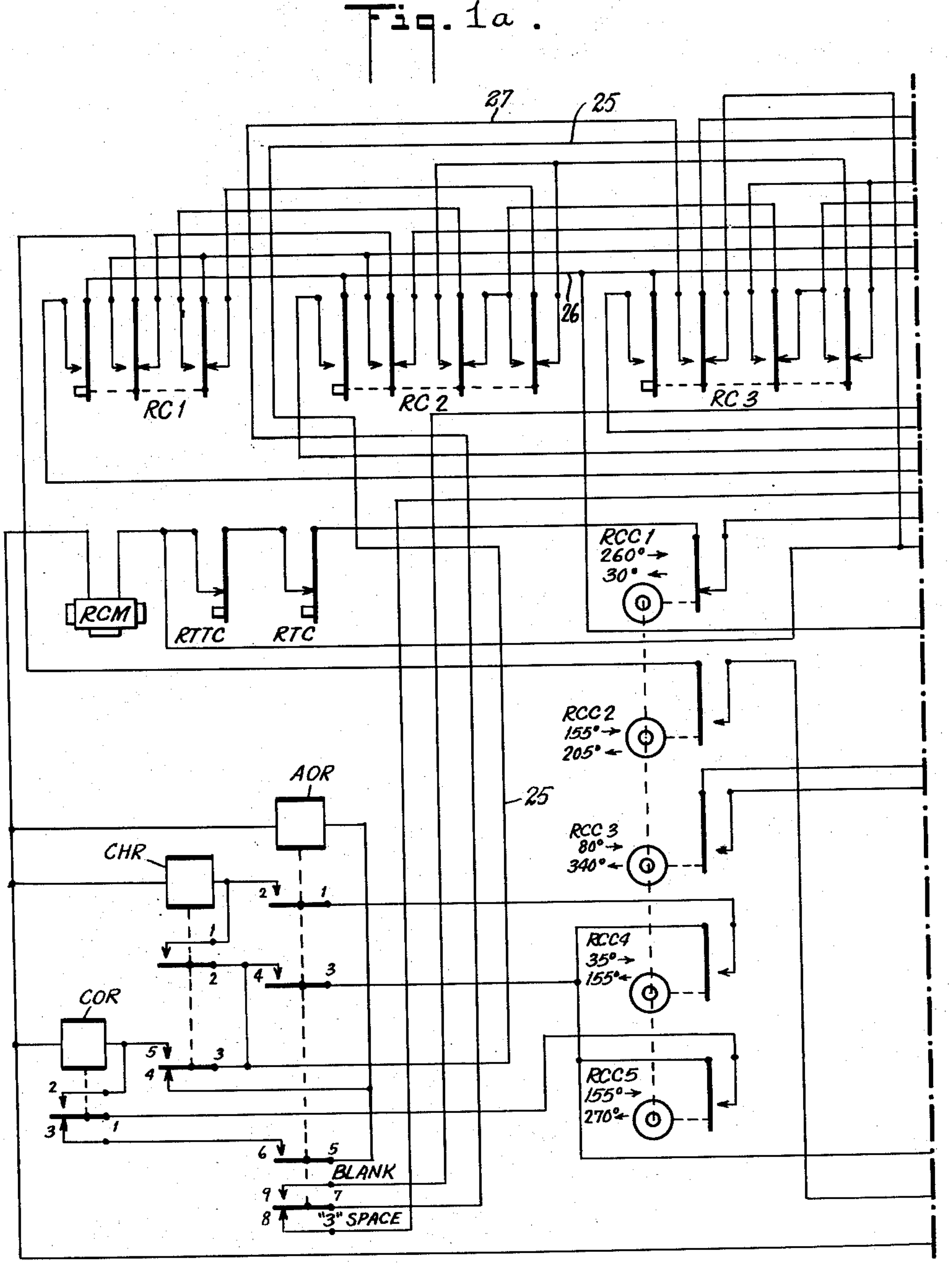

The present invention relates to information translating systems and, particularly, to those portions of such systems which effect verification that translation of data information is accomplished without error.

It is often desirable that data information be translated between associated units of translating equipment, which may be used together at the same location or with one unit remotely situated from the other. This is conveniently and often more expeditiously accomplished by initially generating or recording the information for translation in coded form in which each character, numeral, symbol, and control function required to duplicate the information in printed form is represented by an individual and distinctive code utilizing groups of code bits. These code-bit groups are then translated from the initiating equipment to the terminal equipment for recording or ultimate reproduction of the information in printed form. To insure that the translation of the information is accomplished free of error due to some malfunctioning of the initiating or terminal translating equipment or their interconnecting translation channel, various "parity" checking systems are conventionally used. These have heretofore required that each of the numerous code-bit groups employed in coding the information shall always utilize only odd numbers of code bits in each group ("odd" parity) or conversely shall always utilize only even numbers of code bits in each group ("even" parity) but shall not under any condition utilize both odd and even numbers of code bits.

The prevailing necessity heretofore experienced of using only one type of odd or even parity is undesirably wasteful of code translation capacity since it restricts the total number of information items which may be translated to approximately one-half of the number which might otherwise be translated when using a given maximum number of code bits. For example, the use of seven code bits enables the translation of a total of 127 information items if not restricted by parity considerations but is limited to translation of 64 information items using an odd parity and 63 using even parity. Notwithstanding this undesirable loss of code translation capacity, and the economic disadvantages which it entails, the vertification of error-free translation has been considered of such paramount importance in many applications as to nevertheless demand the use of some form of odd or even parity checking system.

It is an object of the present invention to provide a new and improved information translation system and apparatus which enables the attainment of the maximum code information translation capacity afforded by the use of any given maximum number of code bits and employed in codes having both odd and even parity while at the same time retaining the ability to verify the accurcy of all information translation by parity checking.

It is a further object of the invention to provide an improved coded-information translation system in which essentially continuous verification of accuracy of information translation is accomplished by parity checking code-bit groups involving intermingled use of both odd and even parity codes.

It is an additional object of the invention to provide a novel coded-information translating arrangement which may utilize, in representing the maximum number of individual items of information, the sum total of all possible permutations and combinations of binary code bits available in a preselected maximum number thereof so that both odd and even parity codes are employed, and yet one which effectively accomplishes in a simple and efficient manner both an odd and an even parity check as required of the information translated by means of successive codes and provides immediate and positive indication of any parity error which is found to prevail.

Figure 1:
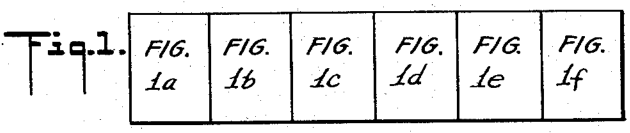
Figure 1B:
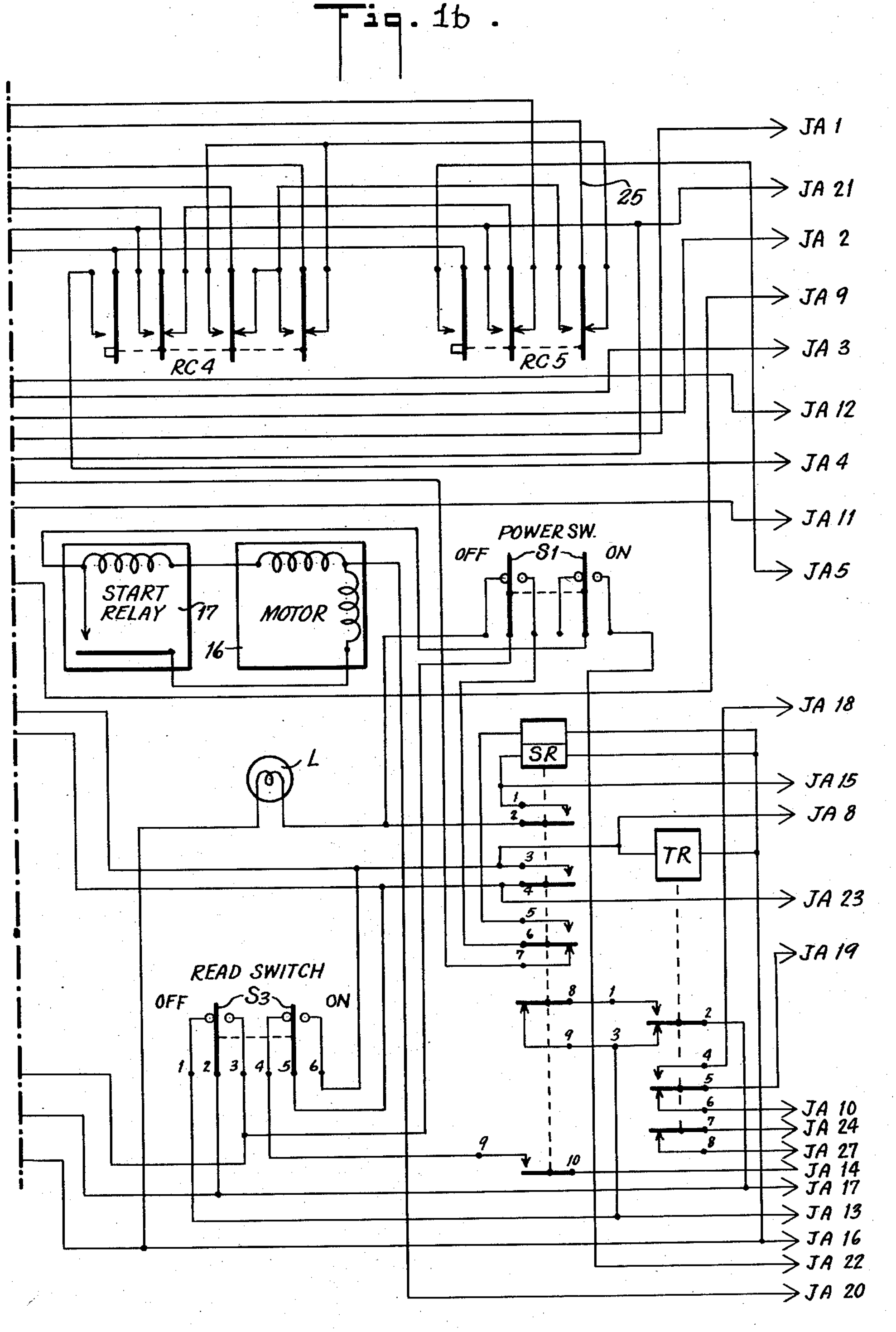
Figure 1C:
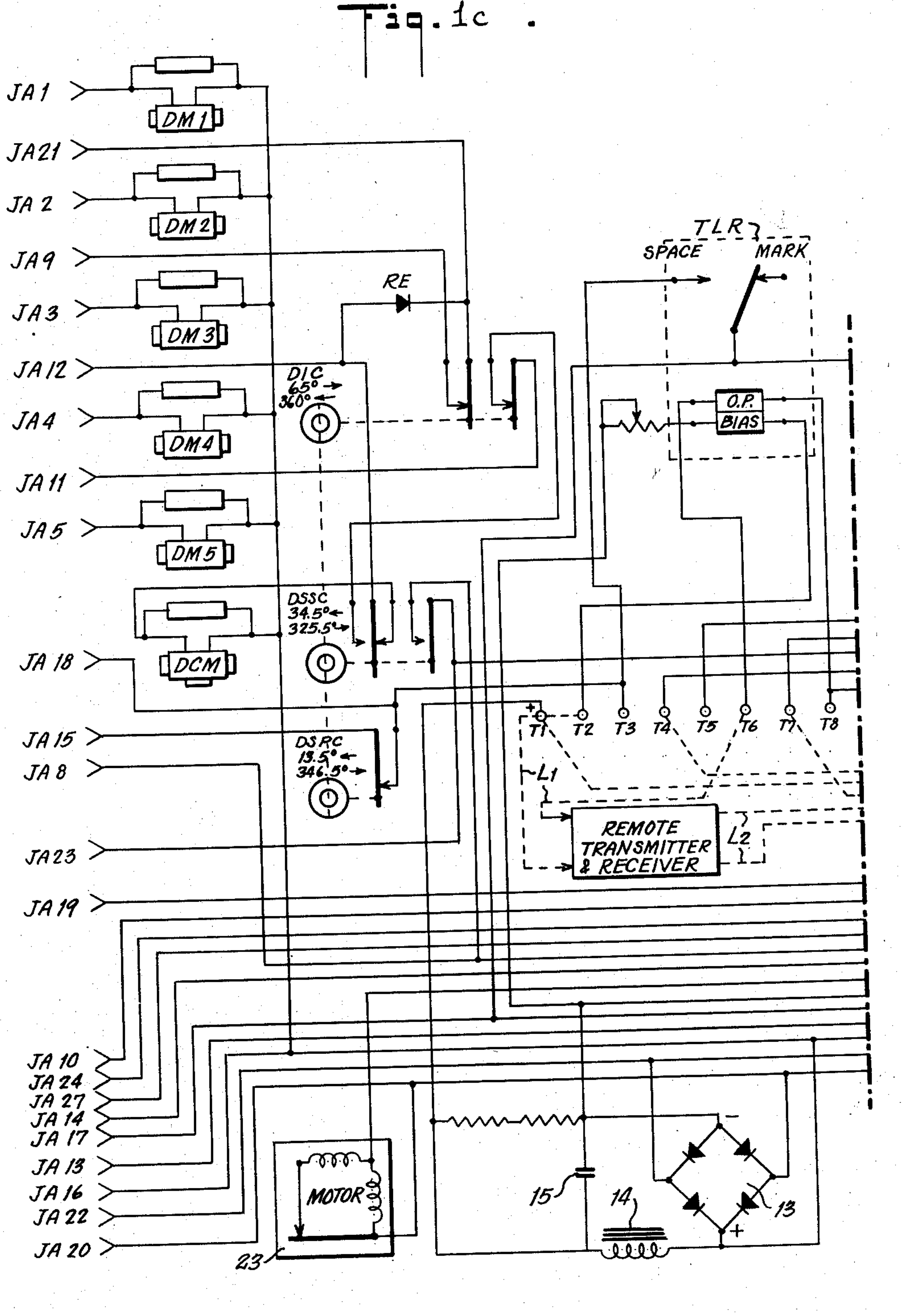
Figure 1D:
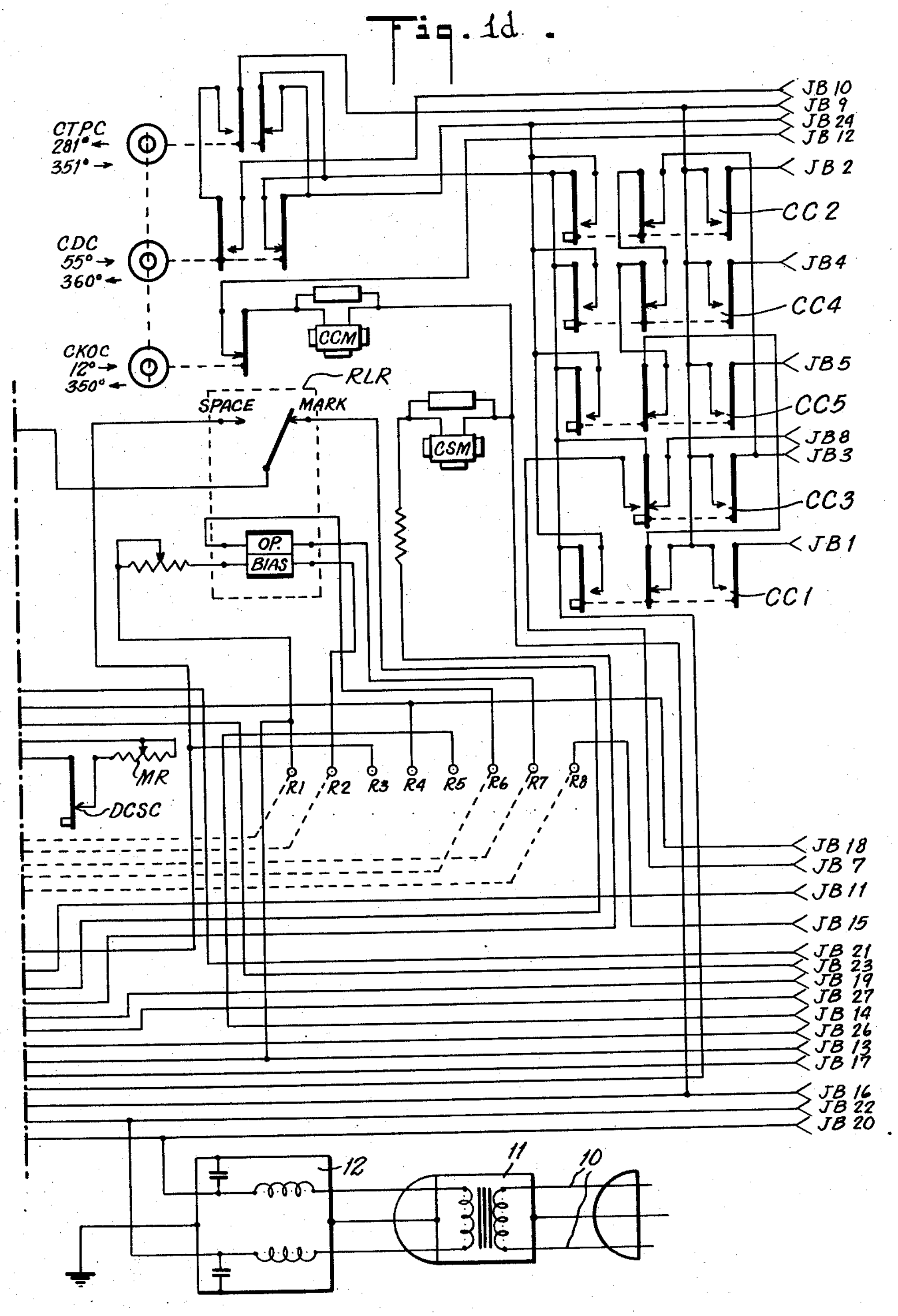
Figure 1E:
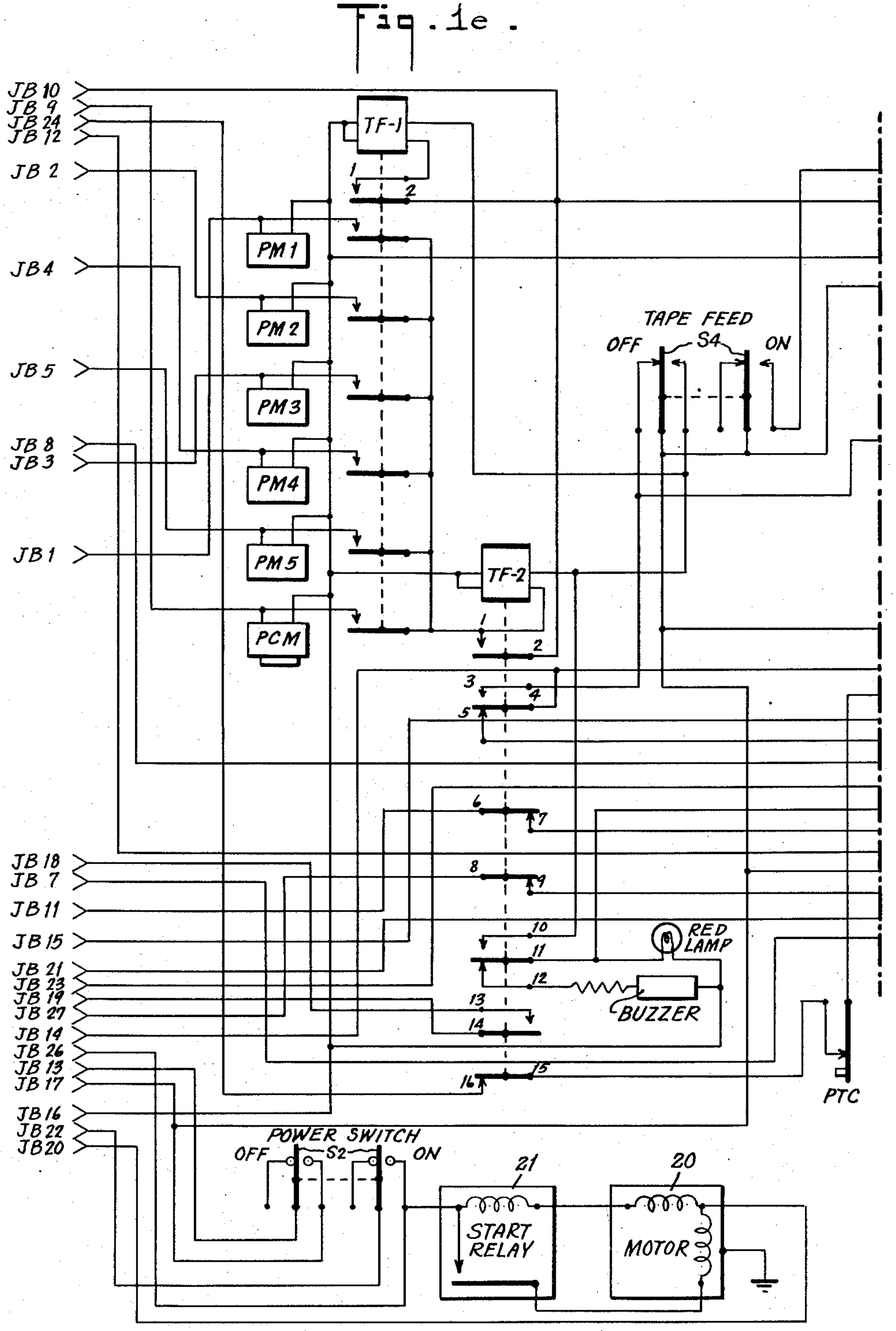
Figure 1F:
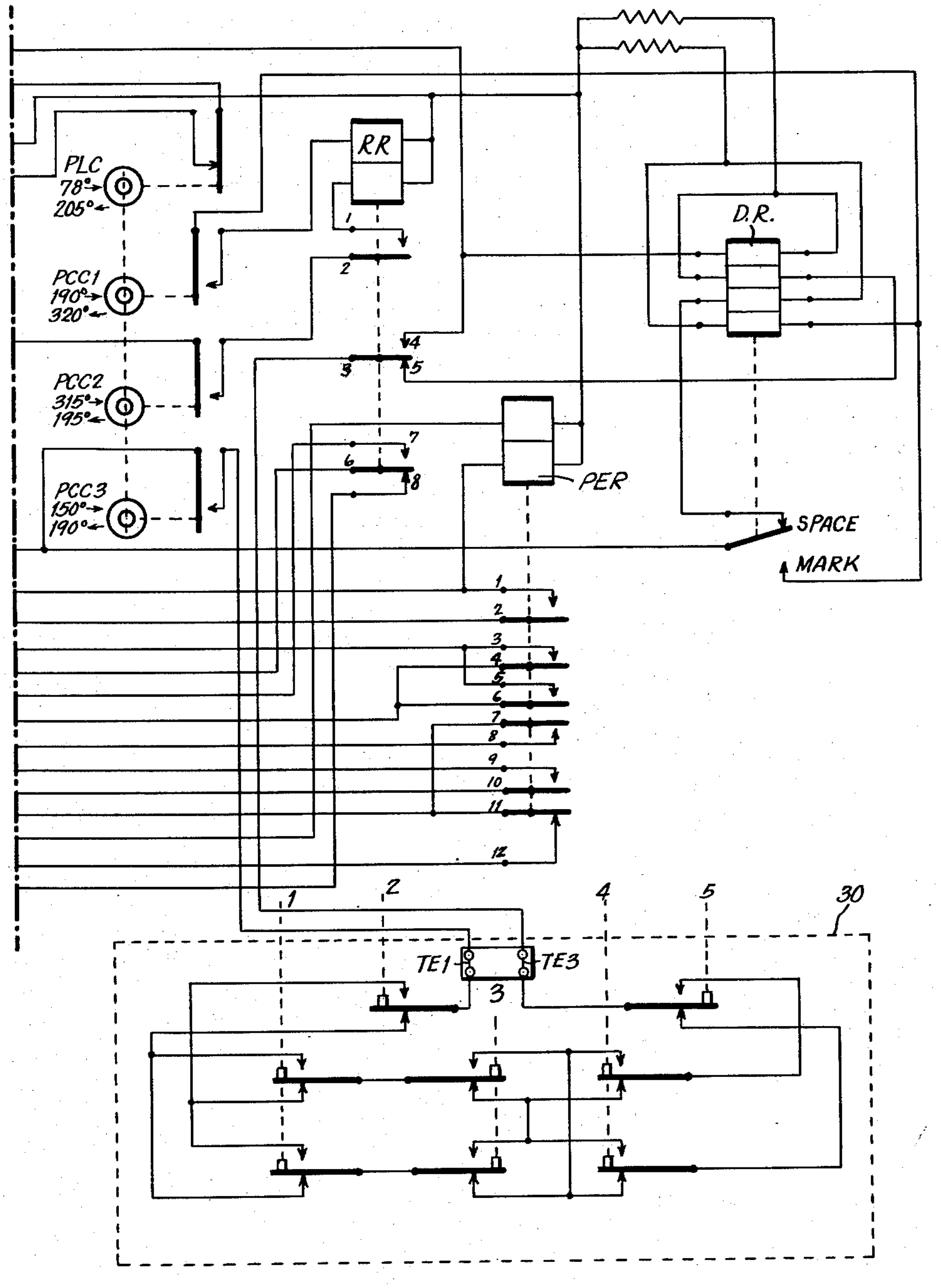
Figure 2:
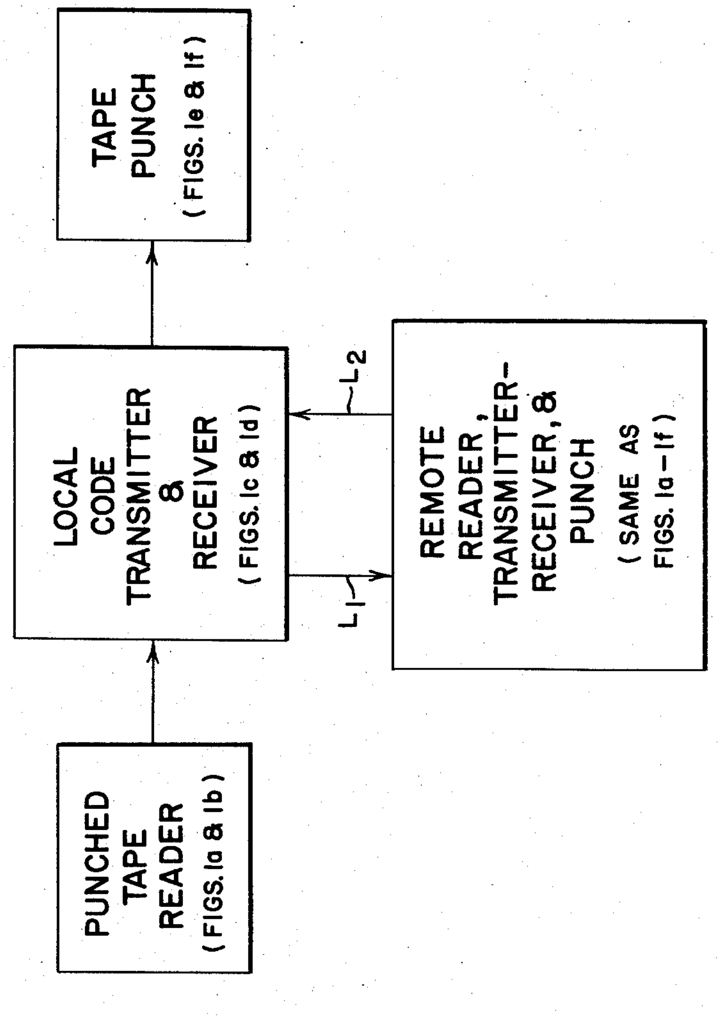

Other objects and advantages of the invention will appear as the detailed description proceeds in the light of the drawings forming a part of this application and in which FIGS. 1*a*–1*f*, considered as arranged in FIG. 1, represent the complete electrical arrangement of a coded-information translating system embodying the present invention in a particular form and FIG. 2 indicates in block-diagram form what may conveniently be considered the several cable-connected and line-connected units used in a complete duplex communication system embodying the invention.

In accordance with the present invention, a coded-information translation system includes a means for utilizing binary-coded representations of individual ones of plural information items, and means for supplying to the utilizing means for use thereby information items each individually represented in binary-code form and of maximum number which may require the use of substantially all of the possible permutations and combinations of the total number of binary code bits available in the code preselected for translation of all information. The system also includes a first means for counting the number of supplied information items having a preselected type of code parity, a second means for counting the number of utilized information items having such preselected type of parity, and means for providing a continuing comparison of the counts of the first and second counting means to indicate lack of identity of code-form parity of the information items supplied by the supply means with those utilized by the utilizing means. In the illustrative embodiment of the invention hereinafter described, the utilizing means is a tape punch unit which receives and punch-records in tape successive items of coded information represented by codes involving intermingled use of both odd and even parity. A punched tape reader reads an input tape to derive successive items of information and supplies these to the tape punch through the intermediary of a parallel-to-series code converter and a series-to-parallel code collector. The reader has electrically-interconnected transfer contact assemblies which control a relay form of binary counter operating to make a binary count of successively read even parity codes, and this binary counter transmits its prevailing binary count to the code collector by control of the code form of the inter-word space code. For a zero count and each subsequent even binary count, the binary count selects a "3" space code for transmission but for each odd binary count a "blank" space code is selected. The tape punch unit includes a conventional system of electrically interconnected parity checking contacts, and these likewise control a relay form of binary counter operating to make a binary count of even parity codes used by the tape punch unit. The prevailing binary count of this counter is compared against the code form ("3" or "blank") of the space code received by the code collector which code, as earlier noted, is representative of the prevailing even-parity binary count of the counter controlled by the type reader contacts. Agreement of the even-parity counts of these counters indicates freedom from any parity error with respect to both the odd-parity and even-parity code forms, but disagreement of the prevailing counts of the counters indicates parity error and effects the halt of the system operation.

GENERAL ORGANIZATION AND OPERATION

The translating system of the present invention has as its general purpose the translation of information over one or more electrical communication channels extending between two localities, which may in certain applications be in immediate proximity and in other applications more remotely situated from each other. A typical example of the translation of information between two locations in immediate proximity is that disclosed in the Edwin O. Blodgett Patent No. 2,700,446, granted January 25, 1955, where information code recorded in punched tape is read and transmitted over plural electrical circuits to control the automatic operation of a printer for reproducing printed copy and the operation of the printer either manually or under automatic control effects translation of coded information over plural electrical circuits to a tape punch for recording. An example of those applications in which information is translated between locations more remotely situated is that disclosed in the Edwin O. Blodgett application Serial No. 608,110, filed September 5, 1956, entitled Code-Form Converter and Communication System, now United States Patent No. 2,979,564, granted April 11, 1961, and assigned to the same assignee as the present application. The present invention, while of general utility, is shown and described herein in a form suitable for use in a translating system of the type disclosed in the last-mentioned Blodgett patent. The system herein described accordingly includes a coded-information transmitter unit, a coded-information receiver unit, and one or a pair of communication channels or circuits interconnecting these units which have such construction and operation as to effect transmission of coded information from one point and its reception and reproduction at a remote point. The code employed for this purpose is of the multi-bit form wherein, as initally developed and as ultimately used, successive groups of parallel or concurrently presented code bits provide individual representations of information items which are comprised by both character print items and functional control items required for the ultimate automatic reproduction of the information in printed form. The code employed may have any desired number of code bits according to the quantity of information items to be translated, and a five-bit or "five-level" code is used by way of example in the translating arrangement hereinafter described.

As hereinafter described in greater detail, a combined transmitter-receiver unit is used at each end of a dual communication channel to translate coded information recorded in punched tape to a receiving locality where it is again punched into an identical tape. In this, the parallel-recorded code bits forming each code group successively recorded in the input information tape are transmitted sequentially over a communication channel in the same general manner as messages are transmitted by commercial teleprinter systems. The present invention is particularly adapted to translate the maximum quantity of information items available in any preselected maximum number of code bits employed while at the same time providing a continuing verification of the accuracy of translation and an automatic control over the system operation to halt transmissions in the event that a translation error is found to occur.

The translation system herein described utilizes a tape reader unit which reads punch-code recorded information items from a tape and supplies successive code-bit groups to a transmitter. The transmitter changes each of these plural-bit code groups from a parallel arrangement of code bits to a sequential arrangement thereof for transmission over a single communication channel or circuit. A receiver at the remote location receives and changes the sequentially received code bits of a code group back into the parallel form for concurrent presentation to and control of the operation of a tape punch unit. These several units may, except for certain differences hereinafter explained, have the general construction and operation shown and described in the aforementioned Blodgett Patent No. 2,979,564, and accordingly will be only briefly described herein as necessary to an understanding of the organization and operation of a translating system embodying the present invention. As pointed out in the latter patent, the equipment used in the translating system is conveniently constructed in three basic units comprised by a transmitter-receiver unit to effect both the transmission and reception of coded-information items in a system adapted for bidirectional communication, a tape reader unit operating in conjunction with the transmitter portion of the transmitter-receiver unit, and a tape punch unit operating in conjunction with the receiver portion of the transmitter-receiver unit. It is this type of unit arrangement which is described herein, and simultaneous two-way transmissions may be effected when full-duplex communication channels are provided as will hereinafter be more fully explained.

The tape reader unit, which is of the motorized completely self-contained type having a construction and operation of the type disclosed in the United States Patent No. 2,927,158, granted March 1, 1960 to Edwin O. Blodgett, has an electrical circuit arrangement as shown in FIGS. 1*a* and 1*b*. The transmitter-receiver unit, which as earlier mentioned may have the construction and operation shown in the aforementioned U.S. Patent No. 2,979,564, has an electrical circuit arrangement as shown in FIGS. 1*c* and 1*d*. The tape punch unit, which is also of the motorized type, may have a construction and operation as disclosed in the aforementioned Blodgett Patent No. 2,927,158, and has an electrical circuit arrangement as shown in FIGS. 1*e* and 1*f*. The organization of these several units in a complete full-duplex communication system for translating information between local and remote points is indicated in FIG. 2.

OVERALL SYSTEM DESCRIPTION

*The Tape Reader Unit and Transmitter Operation of the Transmitter-Receiver Unit*

Alternating current power for energization of the several units is supplied through a power circuit 10 (FIG. 1*d*), an isolation transformer 11, and a noise filter 12. Power flows from the latter to output plug receptacles JA20 and JA22 (FIG. 1*c*), which connect to the motorized tape reader unit (FIG. 1*b*), and to output plug receptacles JB20 and JB22 which connect to the motorized tape punch unit (FIG. 1*e*). Alternating current is also supplied to a full wave rectifier 13 which, through a filter comprising a series inductor 14 and shunt condenser 15, supplies a unidirectional operating potential to all of the several units. The tape reader unit includes a motor 16 (FIG. 1*b*) which is placed in operation through a starting relay 17 by manual actuation of a power switch S1 to its ON position. The motorized tape punch unit also includes a motor 20 (FIG. 2*e*) which is placed in operation through a starting relay 21 by manual actuation of a power switch S2 to its ON position, and the latter switch also supplies through a plug receptacle JB26 energization to a motor 23 (FIG. 1*c*) provided in the transmitter-receiver unit.

Considering now the general intercontrolled operations of the tape reader unit and the transmitter portion of the transmitter-receiver unit, it may be pointed out at the outset that the operation of the tape reader is intermittent and is synchronized with the transmitter operation by a feedback control circuit which impulses a reader clutch magnet RCM (FIG. 1*a*) after the initiation of each cycle of operation of the transmitter. The driving speed of the tape reader is faster than the maximum transmission rate of the transmitter, and the reader clutch is of the 180° type and its magnet RCM is impulsed in a manner such that as each code is read and stored by the reader contacts RC1–RC5 a distributor clutch magnet DCM (FIG. 1*c*) is pulsed to start each transmitter cycle. As explained in the aforementioned Patent No. 2,979,564, the tape reader is provided with a reader tight tape contact RTTC (FIG. 1*a*) and a reader tape contact RTC included in the energizing circuit of the reader clutch magnet RCM and effective automatically to stop operation of the reader in the event that the tape has become excessively tight or at the end of the tape being read.

This intercontrolled operation of the tape reader and transmitter is accomplished in greater particularity by energization of the reader clutch magnet RCM through a plug receptacle JA11 from a transmitter distributor intermediate contact DIC (FIG. 1*e*), transmitter distributor start-stop contacts DSSC (FIG. 1*c*) which close at 34.5° of the distributor cycle, and energization applied either to plug receptacles JA21 or JA12 through a reader cam-actuated contact RCC2 (FIG. 1*a*) and various combinations of the reader contacts RC1–RC5 actuated to transfer position by code hole apertures sensed when reading code groups of the tape. The particular manner of energizing the reader clutch magnet by controlled energization of the plug receptacles JA12 or JA21 will be considered in greater detail hereinafter in connection with the parity check verification phase of operation of the translating system and by which verification of the accuracy of information translation is accomplished. Suffice it to say for the present that the reader clutch magnet RCM controls a 180° clutch so that each energization of the reader clutch magnet advances the tape reader through one-half cycle of its operation. The normal cyclic operation of the reader is such that a reader cam-actuated contact RCC1 (FIG. 1*a*) energizes the reader clutch magnet at the home or 0° cyclic position of the reader so that a reader cycle normally extends from 180° of the reader cycle to the next 180° of the cycle. The reader at its 180° cyclic position has its reader pins extending through any code hole apertures of the read tape, and this extended position of any reader pin effects transfer of the contacts of a corresponding one of the reader contacts RC1–RC5 to open plural pairs of normally closed contacts and close plural pairs of normally open contacts.

When any reader contact is so transferred, it energizes a corresponding one of the code distributor magnets DM1—DM5 (FIG. 1*c*) of the transmitter through plug receptacles JA1—JA5, the energizing circuit including a plug receptacle JA9, the distributor intermediate contacts DIC, and the previously mentioned energizing circuit which includes the plug receptacle JA12 or JA21. At the same time, the distributor clutch magnet DCM is also energized through a distributor start-stop contact DSSC. The intercontrolled operations of the tape reader and transmitter are thus such that the tape reader reads an information-item code from the punched tape and stores the code in its transferred contacts RC1—RC5 awaiting completion of a distributor cycle of operation of the transmitter. As the latter completes its cycle of operation, its distributor magnets DM1—DM5 are energized by any transferred ones of the respective reader contacts RC1—RC5 and the distributor clutch magnet DCM is also energized to initiate a new cycle of the distributor operation. As this cycle begins, the reader clutch magnet RCM is energized through the distributor start-stop contacts DSSC and the reader thereupon proceeds to read the next information-item code from the tape while the distributor is completing its cycle of code transmission.

These intercontrolled operations of the reader and transmitter are also under control of a stop relay SR (FIG. 1*b*) which upon becoming energized opens its contacts 6 and 7 to prevent the cam-actuated contacts RCC1 from pulsing the reader clutch magnet RCM and the reader accordingly stops at its home or zero-cycle position. This, of course, also halts the operation of the transmitter. The stop relay SR is energized through a plug receptacle JA15, the distributor sampling period contacts DSPC (which are closed during the interval when the code distributor is in its home or zero cyclic position), and a transmitter line relay TLR (included in the transmitter-receiver unit) whenever the latter is in its "space" position as will occur upon detection of an error of transmission in a manner to be explained more fully hereinafter. The stop relay SR remains energized as long as the transmitter line relay TLR contacts are in their "space" position, and this energized state of the stop relay is indicated by a warning lamp L which is energized through the contacts 1 and 2 of the stop relay. The stop relay SR establishes its own hold circuit through its transfer contacts 5 and 6, the power switch S1 in the ON position, and the read switch S3 in its ON position. When the warning lamp L is extinguished by the opening of the "space" contacts of the transmitter line relay TLR as occurs when the remote receiver is manually placed back in operation, the tape reader and transmitter is again placed in operation by manual actuation of the read switch S3 first to its OFF position (to interrupt the hold circuit of the stop relay SR) and then to its ON position.

For operation of the system in the half-duplex mode more fully described in the aforementioned Patent No. 2,979,564, a transmit relay TR is energized by manual action of the read switch S3 to its ON position. The energized state of the transmit relay TR prevents (at its open contacts 7 and 8) operation of the receiver portion of the transmitter-receiver unit, and the stop relay SR is now energized through the transferred contacts 4 and 5 of the relay TR by the "space" position of a receiver line relay RLR included in the receiver portion of the transmitter-receiver unit. The transmit relay TR when energized is maintained energized through the reader cam actuated contacts RCC3 until the reader completes a cycle of operation even though the read switch S3 is manually moved to the OFF position during the reader cycle. Additional contacts 1 and 2 of the transmit relay TR in energized position energize through normally closed contacts 8 and 9 of the stop relay SR a plug receptacle JA13 to energize the collector of the receiver in that instance (explained below) where the local receiver is specifically wired to effect repunching in a new tape of the same information read from a tape by the tape reader and transmitted by the transmitter portion of the transmitter-receiver unit.

The transmitter-receiver unit of FIGS. 1*c* and 1*d* includes a plurality of transmitter terminals T1—T8 and receiver terminals R1—R8 which for full two-way duplex operation are interconnected with each other as indicated in broken lines, the transmitter terminals T1 and T6 being further connected by a transmission line L1 to the receiver portion of a remote transmitter-receiver unit as shown and the transmitter portion of the latter being connected through a second transmission line L2 to the receiver terminals R6 and R8 as shown. The remote transmitter-receiver unit has the same construction and operation as that herein described. The code distributor included in the local transmitter includes in addition to the distributor magnets DM1—DM5, the distributor clutch magnet DCM, and the cam-actuated contacts DIC, DSSC and DSPC a further pair of distributor code selector contacts DCSC. As explained in the aforementioned Blodgett Patent No. 2,979,564, the distributor code selector contacts DCSC are closed at the outset of each distributor cycle of operation and as the operating cycle progresses these contacts open and close in accordance with the respective deenergized and energized states of the distributor magnets DM1—DM5 considered as successively sampled in order from the magnet DM1 to the magnet DM5. Thus the information-item code bits which were read by the tape reader unit and applied concurrently or in parallel to the distributor magnets DM1—DM5 are converted by the distributor and particularly by operation of the distributor code selector contacts DCSC for transmission in serial form to the receiver portion of the remote transmitter-receiver. In this, each closure of the distributor code selector contacts DCSC completes an energizing circuit between the transmitter terminals T1 and T6 which are connected to the transmission line L1. This circuit extends from the positively energized transmitter terminal T1 through one line conductor L1 to the remote transmitter-receiver and from the latter back through the other conductor of the line L1 to the transmitter terminal T6; from the latter the energizing circuit continues through one winding of the transmitter line relay TLR, the distributor code selector contacts DCSC, a line-current-control adjustable resistor MR, the transmitter terminal T4, and a jumper connection to the negatively energized receiver terminal R1. As will presently be explained, this energized circuit energizes a receiver line relay in the receiver portion of the remote transmitter-receiver which operates to receive the serially translated code bits and repeat them in succession to a device for conversion to and utilization as a parallel code-bit group.

*The Receiver Portion of the Transmitter-Receiver Unit and the Tape Punch Unit*

Considering now the receiver portion of the transmitter-receiver unit and the tape punch unit which operates in association therewith, it was previously pointed out that the transmitter portion of the remote transmitter-receiver unit is connected through the transmission line L2 to the receiver terminals R6 and R8. Each time that the distributor code selector contacts DCSC of the remote transmitter close to transmit a "mark" code bit, a receiver line relay RLR of the local receiver is energized through a circuit which extends from the receiver terminal R6, one winding of the receiver line relay RLR, the receiver terminal R7, the transmitter terminal T7, a plug receptacle JB23, contacts 3—5 and 4—6 of a parity error relay PER which are normally open but during operation of the receiver and tape punch are closed by energization of the relay PER, and a plug receptacle JB15 to the receiver terminal R8. As earlier mentioned, each code-bit group transmission starts with the circuit last described energized so that the receiver line relay closes its "mark" contacts. However, and as more fully explained in the aforementioned Blodgett Patent No. 2,979,564, the transmission cycle as it progresses causes an initial interruption of the energizing circuit last described so that the receiver line relay RLR closes its "space" contacts. This energizes a collector clutch magnet CCM through a circuit which extends from the negative supply terminal of the rectifier 13 through a plug receptacle JB13, the power switch S2 of the tape punch unit in the ON position of this switch, a plug receptacle JB17, the contacts of the receiver line relay RLR in their "space" position, a plug receptacle JA19, normally closed contacts 5 and 6 of the transmit relay TR and plug receptacles JA10 and JB11, normally closed contacts 6 and 7 of a tape feed relay TF–2 of the tape punch unit, contacts 9 and 10 of the relay PER which are normally open but are closed during operation by energization of this relay, plug receptacle JB12, and collector knockoff contacts CKOC of the code collector which are closed when the collector is in the home or zero position of its operating cycle.

Energization of the collector clutch magnet CCM initiates a cycle of the collector operation, and thereafter the received "mark" and "space" code bits transmitted by the remote transmitter effect corresponding energization or deenergization of the code selector magnet CSM provided in the code collector. As more fully explained in the copending Blodgett Patent No. 2,979,564, the energized state during each successive code bit interval of the code selector magnet CSM causes selective transfer positioning of collector contacts CC1—CC5 to store each code-bit group. Near the end of the collector cycle, those collector contacts CC1—CC5 which have so transferred effect energization of corresponding punch magnets PM1—PM5 of the tape punch unit and concurrent energization of the punch clutch magnet PCM to effect a cycle of punch operation. The energizing circuit last mentioned includes the collector cam actuated contacts CTPC and CDC in series, a plug receptacle JB10, cam actuated contacts PLC of the punch unit, and the power switch S2 in its ON position. A cycle of operation of the tape punch unit is shorter than that of the code collector of the receiver, so that each received code-bit group is punch recorded into a tape at the tape punch unit and the latter completes each punch cycle of operation and waits while the code collector approaches the end of its cycle of operation.

The tape punch unit is initially placed in operation by manual actuation of a tape feed switch S4 to its ON position. Closure of the contacts 1 and 2 of the tape feed switch S4 energizes tape feed relays TF–1 and TF–2 which in turn energize all of the punch magnets PM1—PM8 and the punch clutch magnet PCM to feed tape through the punch unit while concurrently punching a series of delete codes 1—2—3—4—5 during the interval while the tape feed switch S4 is manually actuated. The contacts 1 and 2 of these relays establish a hold circuit for the relay through the punch latch contact PLC from 205° of one punch cycle to 78° of the second punch cycle to insure adequate time for the relays to drop out before completion of a punch cycle and after manual release of the tape feed switch S4 to its OFF position. Upon release of the tape feed switch S4 to resume its OFF position, the parity error relay PER is energized through a circuit which includes the contacts 3 and 4 of the tape feed relay TF–2 (now energized), and the contacts 1 and 3 of the tape feed switch S4 in OFF position. The parity error relay PER is thereafter held in energized position in a manner which will now be more fully explained in connection with the following description of the parity checking operation of the translation system by which a continuous check or verification of the accuracy of information translation is accomplished and operation of the system is automatically halted upon detection of an error.

*Parity Checking of Odd and Even Parity Codes*

Provision for parity checking or checking to verify freedom of error in the translation of coded-information items, starts in accordance with the present invention with the organization and operation of the source of information items which in the arrangement herein described is comprised by the tape reader unit. To this end, and as shown in FIG. 1*a*, the latter includes an alternate operation relay AOR, a change relay CHR and a control operation relay COR. The first even parity information-item code read by the reader unit from the tape energizes the alternate operation relay AOR. This energizing circuit is traced from the negatively energized plug receptacle JA17, the reader cam actuated contacts RCC2, a series circuit extending between various of the transfer contacts of the reader contact assemblies RC1—RC5 when the latter are transferred in pairs (according to the even-parity code read at this time) to a circuit conductor 25, and the normally closed contacts 3 and 4 of the change relay CHR to the winding of the alternate operation relay AOR. The latter relay holds through its contacts 5 and 6, the normally closed contacts 1 and 3 of the control operation relay COR, and the reader cam-actuated contacts RCC5 to 270° of the reader cycle and thereafter holds through the contacts 3 and 4 of the relay AOR, the contacts 1 and 3 of the relay COR, and the contacts 5 and 6 of the relay AOR. On the next reader cycle after the relay AOR has picked up, the reader cam-actuated contacts RCC4 energize the change relay CHR through the now closed contacts 1 and 2 of the relay AOR. The relay CHR establishes a hold circuit for itself through its contacts 1 and 2 and the contacts 3 and 4 of the relay AOR. The next even parity code read from the tape again energizes the conductor 25 through the reader cam-actuated contacts RCC2 and transferred ones of the reader contacts assemblies RC1—RC5, and this energization of the conductor 25 now effects energization of the control operation relay COR. The contacts 1 and 3 of the latter relay open to interrupt the previously described hold circuit for the relay AOR. The relay COR now holds through its contacts 1 and 2 and the contacts 3 and 4 of the relay AOR until the latter relay drop out, and thereafter holds through the contacts 1 and 2 of the relay COR and the cam-actuated contacts RCC5 to 270° of the reader cycle. The change relay CHR likewise continues to hold through the contacts 3 and 4 of the relay AOR until the latter drops out and thereafter continues to hold with the relay COR through the reader cam actuated contacts RCC5 until the latter open at 270° of the reader cycle at which time both the change relay CHR and the control operation relay COR become deenergized and drop out to prepare for subsequent energization of the alternate operation relay AOR by the next even parity code read from the tape.

The relay operation just described holds true even though a second even parity code should be read at the next reader cycle after the alternate operation relay AOR picks up. This is because the change relay CHR has picked up early at 35° of such next reader cycle, thus closing its contacts 3 and 5 to condition the control operation relay COR to be energized when the reader contact assemblies RC1—RC5 transfer just prior to 180° of the reader cycle.

Consider now the operation which prevails prior to reading the first even parity code from the tape and resultant energization of the alternate operation relay AOR. Since all codes read from the tape prior to this first even parity code are odd parity codes, the reader cam-actuated contacts RCC2 apply the negative potential of the plug receptacles JA17 through the first transferred one of the reader contact assemblies RC1—RC5 to the plug receptacle JA21 which thereupon effects energization of the distributor clutch magnet DCM through a rectifier RE and the normally closed contacts of the distributor start-stop contacts DSSC. At the same time, the negative energization of the plug receptacle JA21 is applied through normally closed contacts of the distributor intermediate contact DIC to a plug receptacle JA9 which extends to a conductor 26 common to all of the reader contact assemblies RC1—RC5 and thus permits any transferred one of these contact assemblies to energize its associated distributor magnet DM1—DM5.

A "space" functional item of information identifying the space between two successive character items of information such as between two words, is recorded in the tape as a "three" code. If this code alone should be read at any time prior to reading the first even parity code from the tape, none of the reader contact assemblies RC1, RC2, RC4 or RC5 transfers to energize the output plug receptacle JA21 as previously described. However, the energization of the reader cam-actuated contact RCC2 is now applied through a series of normally closed contacts of the reader contact assemblies RC1, RC2, RC4 and RC5 to a transfer contact of the reader contact assembly RC3 which transfers upon reading the "three" space code and applies energization to a conductor 27. The latter thereupon energizes the plug receptacle JA21 through the normally closed contacts 7 and 8 of the alternate operation relay AOR, and this energization of the plug receptacle JA21 has the effect as before of energizing the distributor clutch magnet DCM and energizing the plug receptacle JA9 so that the transferred reader contact assembly RC3 now effects energization of the distributor magnet DM3 to transmit a "three" space code.

When the first even parity code is read from the tape to energize the alternate operation relay AOR, subsequent odd parity codes read from the tape other than a space code effect energization of the distributor magnets DM1—DM5 and the distributor clutch magnet DCM as previously described. A "three" space code read from the tape, however, effects energization of the conductor 27 as previously described but the energization of this conductor is now applied through the contacts 7 and 9 of the alternate operation relay AOR to a plug receptacle JA12. The latter energizes the distributor clutch magnet DCM through the distributor start-stop contacts DSSC to initiate a cycle of distributor operation, but the rectifier device RE now prevents this energization of the plug receptacle JA12 from being applied through the distributor intermediate contacts DIC to the plug receptacle JA9. This results in a lack of energization of the conductor 26 in the reader unit so that the transferred contacts of the reader contact assembly RC3 now are unable to energize the distributor magnet DM3 as before. It will thus be seen that the energization of the alternate operation relay AOR has caused a space code read from the tape to be transmitted by the distributor as a blank code rather than as a "three" space code as previously described. The next even parity code read from the tape effects deenergization of the alternate operation relay AOR as described above so that the next space code read from the tape is again transmitted by the distributor as a "three" space code.

Accordingly, it will be seen that the transmitted space code has a code form which at any time represents (in the nature of a single digit binary type of summation) the number of even parity codes read from the tape during each interval between successive space codes. That is, all space codes read from the tape are transmitted with a "three" code form to represent an even number count of even parity codes read from the tape and are transmitted with a blank code form to represent an odd number count of even parity codes read from the tape. Thus if it be considered that all information items occurring between successive space codes comprises a group of such items, the form of the space code following the group provides binary-count information of the number of even parity items appearing within the group. It will be evident that the space code form thus transmitted furnishes sufficient parity information to the remote receiver as to enable the latter to make a parity check against the number of even parity codes which it receives.

The manner in which this parity information may be utilized at the remote receiver to verify the accuracy of information translation will now be considered. Referring particularly to FIGS. 1*d* to 1*f*, it was previously explained that the tape feed switch S4 is initially operated to effect a tape feed operation and to pick up the parity error relay PER. At this time, the contacts 4 and 5 of the tape feed switch S4 energize a relay DR provided in the tape punch unit to effect movement of the contacts of this relay to their "space" position. The tape punch unit also is provided with a register relay RR, presently to be described, and actuation of the tape feed switch S4 to its ON position interrupts the hold circuit of this relay to deenergize and drop out the relay in the event that it stands energized at the time of the tape feed operation.

The tape punch unit is also provided with a system of parity check contact assemblies 30. These contact assemblies are actuated by individual ones of the punch pins controlled by the punch magnets PM1–PM5 as indicated by the broken lines, and are so interconnected as to maintain a continuous electrical circuit between the output terminals TE1 and TE3 whenever a blank code or an even parity code is punched during a cycle of operation of the punch unit. Odd parity codes punched by the punch unit interrupt the electrical continuity of the parity check system 30. The first blank or even parity code punched applies negative potential through punch unit cam-actuated contacts PCC3 which close at 150° of the punch cycle, through the parity contact system 30 and the normally closed contacts 3 and 5 of the register relay RR to the relay DR to cause movement of its contacts to their "mark" position. Negative potential is now applied through the latter contacts and the punch unit cam-actuated contacts PCC1, which close at 190° of the punch cycle, to energize the register relay RR. The latter is now held energized through its hold contacts 1 and 2 and the punch unit cam-actuated contacts PCC2 from 315° of one punch cycle to 195° of the next punch cycle, and is held energized through the "mark" contacts of the relay DR and the cam-actuated contacts PCC1 from 190° of such next punch cycle to 320° of the following punch cycle. This maintains the register relay RR continuously energized through successive punch cycles so long as the contacts of the relay DR remain in their "mark" position.

However, the next even parity code punched into the tape by the punch unit applies energization through the cam-actuated contacts PCC3, the parity check contact system 30, and the now closed contacts 3 and 4 of the register relay RR to an energizing winding of the relay DR to cause the latter to move its contacts to their "space" position. The register relay RR now no longer remains energized through the contacts of the relay DR and the cam-actuated contacts PCC1 when the later close at 190° of the punch cycle, and the hold circuit of the relay RR is interrupted by the cam-actuated contacts PCC2 at 195° of the punch cycle thereby dropping out the relay RR. It will accordingly be seen that the interrelated operations of the relay DR and register relay RR are such that the latter effectively provides a single digit binary form summation count of the number of blank and even parity codes which are punched into the tape by the punch unit. The summation count thus effected is now compared with the transmitted summation count parity information (as conveyed by the form of the space code used at the remote transmitter) to provide a parity error check in the following manner.

The parity error relay upon being picked up as previously described by manual actuation of the tape feed switch S4 is maintained in energized state in either of two manners. One of these is by a hold circuit which extends through the contacts 1 and 2 of the relay PER, a punch tape contact PTC which is normally closed when a supply of tape is positioned in the punch unit in readiness to be punched, the normally closed contacts 15 and 16 of the tape feed relay TF-2, a plug receptacle JB24, any transferred one of the collector contact assemblies CC1, CC2, CC4 or CC5 of the code collector of the receiver, a plug receptacle JA13, the contacts 1 and 2 of the tape reader unit read switch S3 in its OFF position or the contacts 2 and 3 of the transmit relay TR when deenergized (or if the latter is energized its contacts 1 and 2 and deenergized stop relay contacts 8 and 9), the plug receptacle JA17, the plug receptacle JB17, and the contacts of the power switch S2 in its ON position to the negatively energized plug receptacle JB13. Thus the hold circuit last described maintains the parity error relay PER in energized position so long as any of the collector contacts CC1, CC2, CC4 and CC5 are closed to store one or more code bits of a received code-bit group without regard to whether the latter has even or odd parity. It will be recalled that the remote transmitter transmits a space code as either a three-space code or a blank space code in dependence upon the binary summation of the even parity codes transmitted. Now when a space code is received and stored by the code collector of the receiver, none of the contact assemblies CC1—CC5 will be transferred during the collector cycle if a blank space code is received or only the contact assembly CC3 will be transferred if a three-space code is received. This affects a second hold circuit of the parity error relay PER which extends from the latter through the normally closed contacts 4 and 5 of the tape feed relay TF-2, and either the normally closed transfer contacts 6 and 8 of the register relay RR to the plug receptacle JB7 or the normally open transfer contacts 6 and 7 of the register relay RR to the plug receptacle JB8. The plug receptacle JB7 is energized by the transfer contact assembly CC3 whenever a three-space code is received, whereas the plug receptacle JB8 is energized only when the contact assembly CC3 of the code collector is in non-transfer position.

In further considering the precise manner by which parity checking is accomplished, assume that all received codes prior to the first received space code have odd parity and that there have been no received blank codes so that the register relay RR stands deenergized. Now when the first space code is received, it should be of the three-space code form for reasons previously explained and accordingly only the contact assembly CC3 of the code collector is transferred to energize the plug receptacle JB7. This energization is that required to maintain the parity error relay PER energized since the transfer contacts 6 and 8 of the register relay RR are closed at this time. However, should a blank code or an even parity code have been punched by the punch unit to energize the register relay RR prior to receiving the three-space code, the energization of the plug receptacle JB7 as last described would not be that which is proper to maintain the parity error relay PER energized since the contacts 6 and 8 of the register relay RR would then be open. This would effect deenergization of the parity error relay PER which would drop out to open its contacts 3—5 and 4—6 and thus interrupt the transmission circuit which extends through the transmission line L2 to the remote transmitter; such interruption would deenergize the transmit line relay TLR of the latter and halt further operation of its tape reader unit to terminate further transmissions in the manner previously described.

If a blank or even parity code has been punched by the punch unit to energize the register relay RR prior to receipt of the first space code and if the latter is of the blank space type to energize the plug receptacle JB8 as previously explained, the parity error relay PER energization will be maintained since the energizing circuit from the plug receptacle JB8 extends through the now closed contacts 6 and 7 of the register relay RR. The receipt of a blank space code, with resultant energization of the plug receptacle JB8, would not maintain the parity error relay PER energized if the register relay RR should be deenergized at this time by failure of the punch unit previously to have punched a blank or even parity code or by the fact that the punch unit had punched two such codes.

It will be noted that normally open contacts of the collector contact assemblies CC1, CC2, CC4 and CC5 are paralleled by normally closed contacts of the collector cam-actuated contacts CTPC and CDC of which the contacts CDC are opened from 55° to 360° of each collector cycle and the contacts CTPC are opened from 281° to 351° of the collector cycle. Thus the cam-actuated collector contacts CTPC not only energize the collector contact assemblies CC1—CC5 near the end of the collector cycle as earlier described, but in addition provide a hold circuit through plug receptacle JB24 for the parity error relay PER except during interval 281° to 351° of the collector cycle at which time the transfer of the collector contact assemblies CC1—CC5 has been completed. This auxiliary hold circuit for the parity error relay PER insures that the latter when picked up by manual operation of the tape feed switch S4 shall thereafter hold even though some condition of transmission has occurred (such as a temporarily open circuited transmission line) by virtue of which all of the collector contact assemblies CC1—CC5 are latched open at the end of a collector cycle due to failure to receive a three-space code which should have been received during such collector cycle (and which if received would have transferred the contact assembly CC3 to complete a hold circuit for the parity error relay PER by energization of the plug receptacle JB7).

It will accordingly be seen from the foregoing description of the invention that the code form of the transmitted functional space item of information not only conveys this functional item, but in addition by its code form at any time conveys a binary summation of the number of even-parity codes transmitted since the preceding functional space item of information. The punch unit in automatically performing a similar binary summation of the number of even-parity codes which are punch recorded by it, and storing such summation by operation of the register relay RR, is enabled to make a continuing verification of the accuracy with which information items are derived by the tape reader unit (operating as a source of information items) and are recorded by the tape punch unit (which utilizes these items). This continuing verification of freedom from parity error is accomplished even though the items of information are represented by code forms which utilize all of the possible combinations and permutations available by use of a predetermined maximum number of code-bit channels preselected for the translation of all information items. In other words, adequate parity error is supplied to the information receiver without diminishing in the least the maximum capacity of information translation possible within a preselected number of code levels.

The transmitter-receiver of FIGS. 1*c* and 1*d* may be operated in the half duplex mode utilizing a two-wire communication channel with channel energization supplied by the transmitter-receiver unit. This is accomplished by connecting the transmitter terminal T1 to the receiver terminal R2, by connecting the transmitter terminal T7 to the receiver terminal R7, by connecting the transmitter terminal T8 to the receiver terminal R8, by connecting the transmitter terminal T4 to the receiver terminal R1, by connecting the receiver terminal R1 to the receiver terminal R4, and by connecting the transmission line to the transmission terminal T1 and the receiver terminal R6. The same type of operation with local repunching of the information transmitted to a remote transmitter-receiver unit may be accomplished with the connections just described but with the difference that the transmitter terminal T3 is connected to the receiver terminal R3 and the connection between the receiver terminals R1 and R4 is broken.

Half duplex operation utilizing a two-wire transmission channel with external line power may be accomplished by connecting the terminals T1—R2, T7—R7, T8—R8, R1—R4, and by connecting the line conductors to the transmitter terminal T4 and the receiver terminal R6. The same operation accompanied by local repunching of the information transmitted to a remote transmitter-receiver unit is accomplished by the connections just described with the difference that the transmitter terminal T3 is connected to the receiver terminal R3 and the connection between the receiver terminals R1 and R4 is broken.

The translation system particularly described above is one for full duplex operation using two two-wire transmission circuits with power supplied by the local and remote transmitter-receiver units. The same operation may be accomplished with external line power simply by interrupting the connection between the transmitter terminal T4 and the receiver terminal R1 and by connecting the transmission line to the transmitter terminals T4 and T6.

Operation of the system in the half duplex mode utilizing two two-wire communication channels with transmission line energization furnished by the local and remote transmitter-receiver units may be accomplished by connecting T1 to R2, T8 to R8, T4 to R1, R1 to R4, T5 to R3, and by connecting the transmission line to the transmitter terminals T1 and T7 and the receive line to the receiver terminals R6 and R7. The same mode of operation with the transmission lines energized by sources external to the transmitter-receiver units may be accomplished by connecting the terminals T1—R2, T8—R8, R1—R4, T5—R3, and by connecting the transmission line to the transmitter terminals T4 and T7 and the receive line to the receiver terminals R6 and R7.

While a specific form of the invention has been described for purposes of illustration, it is contemplated that possible changes may be made without departing from the spirit of the invention.

I claim:

1. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in the code preselected for translation of all information, first means for counting the number of supplied information items having a preselected type of code parity, second means for counting the number of utilized information items having said preselected type of parity, and means for providing a continuing comparison of the counts of said first and second counting means to indicate lack of identity of code-form parity of the information items supplied by said supply means with those utilized by said utilizing means.

2. A coded-information translating system comprising, means for utilizing individual ones of plural information items successively presented thereto in binary-coded form having concurrently presented code bits, means for developing successively presented information items each individually represented in binary-coded form having consecutively presented code bits, the maximum number of said information items requiring substantially all of the possible permutations and combinations of the total number of binary code bits available in the maximum number of code levels preselected for translation of all information, means responsive to said developed information items for supplying to said utilizing means for use thereby information items in binary-coded form having concurrently presented code bits, first means for counting the number of information items developed by said second named means and having a preselected type of code parity, second means for counting the number of utilized information items having said preselected type of parity, and means for providing a continuing comparison of the counts of said first and second counting means to indicate lack of identity of code-form parity of the information items developed by said second-named means with those utilized by said utilizing means.

3. A coded-information translating system comprising, means for utilizing individual ones of plural information items successively presented thereto in binary-coded form having concurrently presented code bits, means for translating successively presented information items each individually represented in binary-coded form having consecutively presented code bits, the maximum number of said information items requiring substantially all of the possible permutations and combinations of the total number of binary code bits available in the maximum number of code levels preselected for translation of all information, said translating means including means responsive to the code forms of information items translated for automatically selecting code forms of one repetitive information item to effect translation concurrently of said one information item and odd-even partiy information applicable to other preceding information items preselected since the preceding translation of said one information item, means responsive to said translated information items for supplying to said utilizing means for use thereby information items in binary-coded form having concurrently presented code bits, and means responsive to the prevailing code form of said one information item as supplied to said utilizing means for indicating lack of identity of code-form parity of the information items translated by said translating means with those utilized by said utilizing means.

4. A coded-information translating system comprising, means for utilizing binary-coded representations of individual ones of plural information items, means for originating and supplying to said utilizing means for use thereby information items each individually represented in binary-coded form and of maximum number which may require the use of substantially all of the possible permutations and combinations of the total number of binary code bits available in a preselected maximum number thereof, and means for indicating lack of identity of code-form parity by groups of the information items originated by said supply means with those utilized by said utilizing means.

5. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including for groups of information items an indication of the number of parity changes in each said group thereof, and means responsive to said supplied indication for indicating lack of identity of said indicated code-form parity changes of each said group of information items supplied by said supply means with those utilized by said utilizing means.

6. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including for groups of information items an indication of the number of parity changes in each said group thereof, means for indicating lack of identity of said indicated code-form parity changes of each said group of information items supplied by said supply means with those utilized by said utilizing means, and means controlled by said indicating means for halting the operation of said utilizing means upon failure of identity of said group parity changes.

7. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including information of the alternating changes of odd-even parity occurring within each of successive groups of information items, means for indicating for each information item utilized by said utilizing means the code-form odd-even parity thereof, and means jointly responsive to said code-form parity information for each said item group and to the code-form parity change alternations occurring within the corresponding group of information items as established by said indicating means for providing an indication of lack of parity identity.

8. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including partity information distinctively identifying in each of successive information-item groups the number of information items which originally are represented by code forms utilizing one type of code-form partity, and means jointly controlled by said parity information and by information items having said one type of parity for monitoring by information-item groups the comparative identity of original code-form parities with those of the information items as utilized by said utilizing means to indicate parity error in said utilized information items.

9. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including parity information distinctively identifying in each of successive information-item groups the number of information items which originally are represented by code forms utilizing one type of code-form parity, means responsive to said supplied information items to derive for each group thereof a binary-form count of the number of items represented by code forms utilizing said one type of parity, and means controlled by said supplied parity information and responsive to said derived count for providing an indication of parity error.

10. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including parity information distinctively identifying in each of successive information-item groups the number of informaton items which originally are represented by code forms utilizing one type of code-form parity, a parity check electrical contact system actuated by said supplied information items, means controlled by said contact system to derive for each said group of information items an indication of the number of items represented by code forms utilizing said one type of parity, and means jointly controlled by said parity information and by said last-named means for providing an indication of parity error.

11. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total member of binary code bits available in a preselected maximum number thereof and including parity information distinctively identifying in each of successive information-item groups the number of information items which originally are represented by code forms utilizing one type of code-form parity, register means controlled alternately to each of two operating states thereof by successive supplied information items having code forms utilizing said one type of parity, and means jointly controlled by said parity information and the operative states of said register means for controlling by information-item groups the operative state of said utilizing means.

12. A coded-information translating system comprising, means for utilizing binary-coded representations of individual ones of plural information items, means for originating and supplying to said utilizing means for use thereby information items each individually represented in binary-coded form and of maximum number which may require the use of substantially all of the possible permutations and combinations of the total number of binary code bits available in a preselected maximum number thereof, means included in said originating means for supplying parity information indicating by successive information-item groups the number of originated information items which are represented by code forms utilizing a selected type of code-form parity, and means responsive to said parity information for comparing by information-item groups the number of information items utilized by said utilizing means and having said preselected type of parity with the number thereof indicated by said parity information as having been originated by said originating means to indicate by inequality of comparison error in said utilized information items.

13. A coded-information translating system comprising means for utilizing binary-coded representations of individual ones of plural information items, means for originating and supplying to said utilizing means for use thereby information items each individually represented in binary-coded form and of maximum number which may require the use of substantially all of the possible permutations and combinations of the total number of binary code bits available in a preselected maximum number thereof, means responsive to information items represented by code forms utilizing a preselected type of code-form parity for developing parity information applicable to each of successive information-item groups, and means jointly controlled by said developed parity information and by those information items in each information-item group utilized by said utilizing means and which have said preselected type of parity to indicate by parity inequality of said preselected type error in said utilized information items.

14. A coded-information translating system comprising, means for utilizing binary-coded representations of individual ones of plural information items, means for originating and supplying to said utilizing means for use thereby information items each individually represented in binary-coded form and of maximum number which may require the use of substantially all of the possible permutations and combinations of the total number of binary code bits available in a preselected maximum number thereof, means responsive to each of successive information items represented by code forms utilizing a preselected type of code-form parity for modifying alternately between two code forms the code-form representation of a preselected type of information item, means responsive to each of successive information items as utilized by said utilizing means and as represented by code forms utilizing said preselected type of code-form parity for developing alternate control effects, and means jointly responsive to the code-form representation of said preselected type of information item and to said alternate control effects for indicating parity error occurring in said utilized informaton items.

15. A coded-information translating system comprising, means for utilizing binary-coded representations of individual ones of plural information items, means for supplying to said utilizing means for use thereby information items which upon origination are each individually represented in binary-coded form and are of maximum number which may require the use of substantially all of the possible permutations and combinations of the total number of binary code bits available in a preselected maximum number thereof and including parity information distinctively identifying in each of successive information-item groups the number of information items which originally are represented by code forms utilizing even code-form parity, and means jointly controlled by said parity information and by information items having said even code-form parity for monitoring by information-item groups the comparative identity of original code-form parities with those of the information items as utilized by said utilizing means to indicate parity error in said utilized information items.

16. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including parity information distinctively identifying in each of successive information-item groups the number of information items which originally are represented by code forms utilizing even code-form parity, means responsive to said supplied information items for deriving parity information distinctively identifying in each of said successive information-item groups the number of supplied information items which are represented by code forms utilizing even code-form parity, and means controlled by said supplied parity information and responsive to said derived parity information for indicating parity error in information items utilized by said utilizing means.

17. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combination of the total number of binary code bits available in a preselected maximum number thereof and including parity information distinctively identifying in each of successive information-item groups the number of information items which originally are represented by code forms utilizing even code-form parity, means responsive to said supplied information items for deriving parity information distinctively identifying in each of said successive information-item groups the number of supplied items which are represented by code forms utilizing even code-form parity, and means controlled by said supplied parity information and responsive to said derived parity information for halting the operation of said utilizing means upon deviation from identity of said supplied and derived parity information.

18. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof and including one type of information item represented by each of two binary codes which by alternating change of code form furnish information distinctively identifying a binary summation of information-item parity changes taking place during the interval between successive occurrences of said one type of information item, and means controlled by said parity information for monitoring the identity of binary summation count of said code-form parity changes of the information items supplied by said supply means during said interval with those of the information items utilized by said utilizing means.

19. A coded-information translating system comprising, means for utilizing binary-coded representations of individual ones of plural information items, means for supplying to said utilizing means for use thereby information items each individually represented in binary-coded form and of maximum number which may require the use of substantially all of the possible permutations and combinations of the total number of binary code bits available in a preselected maximum number thereof, said means supplying a functional-space information item represented by each of two binary codes which by alternating change of code form furnish information distinctively identifying a binary summation of information-item parity changes taking place during the interval between successive occurrences of said functional-space information item, and means controlled by said parity information for monitoring the identity of binary summation count of said code-form parity changes of the information items supplied by said supply means during said interval with those of the information items utilized by said utilizing means.

20. A coded-information translating system comprising, means for utilizing binary-coded representations of individual ones of plural information items, means for reading a record medium to derive therefrom and supply to said utilizing means for use thereby successive information items each individually represented in binary-coded form and of maximum number which may require the use of substantially all of the possible permutations and combinations of the total number of binary code bits available in a preselected maximum number thereof, first counting means responsive to the parity of said derived information items for performing and storing a binary summation count of the derived information items having even parity and for controlling in conformity with said count the code form of one item of information derived from said medium and supplied for use by said utilizing means, second counting means responsive to the parity of information items utilized by said utilizing means for performing and storing a binary summation count of the utilized items having even parity, and means responsive to the code form of said one item of supplied information and to the stored binary summation count of said second counting means for indicating parity error between said derived and utilized information items.

21. A coded-information translating system comprising, means for utilizing binary coded representations of individual ones of plural information items, means for supplying to said utilizing means for use thereby information items in binary-coded form utilizing permutations and combinations of binary code bits having both odd and even type of parity coding, means for additionally supplying to said utilizing means one information code having one of two forms representing a binary digit count of the number of codes of one parity type supplied to said utilizing means, counting means for maintaining a binary digit count of the number of codes of said one parity type utilized by said utilizing means, and means responsive to the code form with which said one information code is supplied each time and to the binary count of said counting means for indicating lack of identity of code-form parity of the information items supplied by said supply means with those utilized by said utilizing means.

References Cited in the file of this patent

UNITED STATES PATENTS

| | | |
|---|---|---|
| Re. 23,601 | Hamming et al. | Dec. 23, 1952 |
| 2,470,145 | Clos | May 17, 1949 |
| 2,550,600 | Rehm | Apr. 24, 1951 |
| 2,674,727 | Spielberg | Apr. 6, 1954 |
| 2,696,599 | Holbrook et al. | Dec. 7, 1954 |